(12) United States Patent  (10) Patent No.: US 8,919,795 B2
Juriga  (45) Date of Patent: Dec. 30, 2014

(54) SEPARATED PRIMARY SPRING AND SECONDARY LEAF SUSPENSION FOR VEHICLE

(75) Inventor: James Andrew Juriga, Beverly Hills, MI (US)

(73) Assignee: Rassini, S.A. de C.V. (MX)

( * ) Notice: Subject to any disclaimer, the term of this patent is extended or adjusted under 35 U.S.C. 154(b) by 1480 days.

(21) Appl. No.: 12/449,444

(22) PCT Filed: Feb. 7, 2008

(86) PCT No.: PCT/US2008/001719
§ 371 (c)(1),
(2), (4) Date: Jun. 19, 2012

(87) PCT Pub. No.: WO2008/097647
PCT Pub. Date: Aug. 14, 2008

(65) Prior Publication Data
US 2013/0062855 A1  Mar. 14, 2013

Related U.S. Application Data

(60) Provisional application No. 60/900,796, filed on Feb. 7, 2007, provisional application No. 60/921,881, filed on Apr. 3, 2007, provisional application No. 60/994,779, filed on Sep. 21, 2007.

(51) Int. Cl.
*B60G 11/06* (2006.01)
*B60G 11/04* (2006.01)
(Continued)

(52) U.S. Cl.
CPC .............. *B60G 9/00* (2013.01); *B60G 17/0272* (2013.01); *B60G 11/113* (2013.01); *B60G 11/06* (2013.01); *B60G 2204/421* (2013.01);
(Continued)

(58) Field of Classification Search
USPC ......... 280/124.174, 124.17, 124.175; 267/45, 267/41, 36.1, 244, 260, 38
See application file for complete search history.

(56) References Cited

U.S. PATENT DOCUMENTS 562,289 A   6/1896   DeDion et al.
1,086,182 A   2/1914   Jackson
(Continued)

FOREIGN PATENT DOCUMENTS

DE   389209   8/1924
FR   1168345   12/1958
(Continued)

OTHER PUBLICATIONS

English Translation of Notice of Rejection dated Apr. 23, 2013, JP Patent Application No. 2009549112; 2 pgs.

(Continued)

*Primary Examiner* — Keith Frisby
(74) *Attorney, Agent, or Firm* — Cantor Colburn LLP

(57) ABSTRACT

A suspension for a vehicle having a chassis rail and a longitudinal axle arranged substantially orthogonal thereto. The vehicle suspension has a primary spring, which may be a leaf spring having a first end for pivotally coupling to the chassis of the vehicle at a first primary pivot coupling, and a distal second end for pivotally coupling to the chassis of the vehicle at a second primary pivot coupling. The primary spring can be a coil spring. A secondary leaf spring has a first end for pivotally coupling to the chassis of the vehicle at a secondary pivot coupling, and a second end for coupling to the axle. The longitudinal configuration of the secondary leaf spring is arranged to be angularly displaced with respect to the longitudinal configuration of the primary leaf spring. The first primary pivot coupling and the secondary pivot coupling are arranged to be substantially coplanar.

13 Claims, 13 Drawing Sheets

(51) Int. Cl.
| | |
|---|---|
| *B60G 17/027* | (2006.01) |
| *B60G 11/113* | (2006.01) |
| *B60G 11/36* | (2006.01) |
| *B60G 9/00* | (2006.01) |
| *B60G 11/46* | (2006.01) |
| *B60G 17/02* | (2006.01) |
| *B60G 11/12* | (2006.01) |

(52) U.S. Cl.
CPC ......... *B60G 11/36* (2013.01); *B60G 2204/121* (2013.01); *B60G 2202/12* (2013.01); *B60G 11/04* (2013.01); *B60G 2500/30* (2013.01); *B60G 17/0275* (2013.01); *B60G 2200/314* (2013.01); *B60G 2204/4502* (2013.01); *B60G 11/465* (2013.01); *B60G 17/023* (2013.01); *B60G 2202/112* (2013.01); *B60G 2202/152* (2013.01); *B60G 11/12* (2013.01)
USPC ............ 280/124.174; 280/124.175; 267/36.1; 267/260; 267/38

(56) References Cited

U.S. PATENT DOCUMENTS

| | | | |
|---|---|---|---|
| 1,561,083 A | | 5/1921 | Kettering |
| 1,453,467 A | | 5/1923 | Knippel |
| 1,594,530 A | * | 8/1926 | Klein ............................ 267/45 |
| 2,236,868 A | | 4/1941 | Cook |
| 2,304,780 A | | 12/1942 | DeFries |
| 2,632,639 A | | 3/1953 | Proske |
| 2,716,461 A | | 8/1955 | MacPherson |
| 2,791,419 A | | 5/1957 | Whelen |
| 2,825,578 A | | 3/1958 | Walker |
| 2,826,407 A | | 3/1958 | Scheublein, Jr. et al. |
| 2,969,230 A | | 1/1961 | Scheublein, Jr. et al. |
| 2,990,170 A | | 6/1961 | Perdue et al. |
| 3,034,802 A | | 5/1962 | Axtmann |
| 3,170,712 A | | 2/1965 | Hildebrandt et al. |
| 3,191,711 A | * | 6/1965 | Conner ........................ 180/345 |
| 3,228,489 A | * | 1/1966 | Kozicki ................. 280/124.156 |
| 3,231,258 A | | 1/1966 | Brownyer et al. |
| 3,305,230 A | | 2/1967 | Musser |
| 3,312,459 A | | 4/1967 | Pence |
| 3,373,834 A | | 3/1968 | Rosenkrands |
| 3,420,544 A | | 1/1969 | Draves |
| 3,462,169 A | | 8/1969 | Carter |
| 3,484,091 A | | 12/1969 | Draves |
| 3,497,235 A | | 2/1970 | Peer |
| 3,572,749 A | | 3/1971 | Yew et al. |
| 3,659,671 A | | 5/1972 | Heinze |
| 3,948,334 A | | 4/1976 | Danielson et al. |
| 4,004,826 A | * | 1/1977 | Subhedar ............... 280/124.176 |
| 4,614,247 A | | 9/1986 | Sullivan |
| 4,676,523 A | | 6/1987 | Rogers |
| 4,736,931 A | | 4/1988 | Christopherson |
| 4,981,286 A | | 1/1991 | Kato et al. |
| 4,982,972 A | | 1/1991 | Preston et al. |
| 5,024,463 A | | 6/1991 | Oliver et al. |
| 5,029,893 A | | 7/1991 | Walton et al. |
| 5,035,408 A | | 7/1991 | Walton et al. |
| 5,098,121 A | | 3/1992 | Walton et al. |
| 5,123,672 A | | 6/1992 | Walton et al. |
| 5,129,633 A | | 7/1992 | Walton et al. |
| 5,129,671 A | | 7/1992 | Walton |
| 5,137,300 A | | 8/1992 | Walton |
| 5,172,930 A | | 12/1992 | Boye et al. |
| 5,188,195 A | | 2/1993 | Haustein |
| 5,335,934 A | | 8/1994 | Hiller |
| 5,346,247 A | | 9/1994 | Snyder |
| 5,390,949 A | | 2/1995 | Naganathan et al. |
| 5,401,049 A | | 3/1995 | Richardson |
| 5,573,088 A | | 11/1996 | Daniels |
| 5,951,233 A | | 9/1999 | Boucher et al. |
| 6,079,723 A | | 6/2000 | Choi |
| 6,308,971 B1 | | 10/2001 | Mikaelsson et al. |
| 6,371,466 B1 | | 4/2002 | Spears |
| 6,394,474 B1 | | 5/2002 | Warinner et al. |
| 6,722,677 B2 | | 4/2004 | Carlstedt et al. |
| 6,739,608 B2 | * | 5/2004 | Warinner et al. ...... 280/124.163 |
| 7,144,031 B2 | | 12/2006 | Fenton |
| 7,950,678 B1 | | 5/2011 | Bauder |
| 2005/0269796 A1 | | 12/2005 | Sawarynski et al. |
| 2006/0290089 A1 | | 12/2006 | Dudding et al. |
| 2009/0085318 A1 | | 4/2009 | Guthrie |
| 2011/0001300 A1 | | 1/2011 | Juriga |
| 2011/0140388 A1 | | 6/2011 | Juriga |
| 2012/0161411 A1 | | 6/2012 | Ehrlich et al. |
| 2012/0200057 A1 | | 8/2012 | Juriga |

FOREIGN PATENT DOCUMENTS

| | | | |
|---|---|---|---|
| FR | 2647718 | | 7/1990 |
| GB | 855805 | | 12/1960 |
| JP | 5028683 | | 9/1975 |
| JP | 59063212 | | 4/1984 |
| JP | 61165806 | | 10/1986 |
| JP | 1-107608 | * | 7/1989 ............. B60G 11/12 |
| JP | 01107608 | | 7/1989 |
| JP | 1107608 | | 7/1989 |
| JP | 03115505 | | 11/1991 |
| JP | 03208713 | | 11/1991 |
| JP | 3121104 | | 12/1991 |
| JP | 04113044 | | 4/1992 |
| JP | 04228315 | | 8/1992 |
| JP | 04342605 | | 11/1992 |
| JP | 05096926 | | 4/1993 |
| JP | 05270227 | | 10/1993 |
| JP | 08300993 | | 11/1996 |
| JP | 09042349 | | 10/1997 |
| JP | 2005096494 | | 4/2005 |
| JP | 3810228 | | 8/2006 |
| WO | 2006121438 A2 | | 11/2006 |
| WO | 2007149442 A2 | | 12/2007 |

OTHER PUBLICATIONS

Notice of Rejection dated Apr. 23, 2013, JP Application No. 2009549112; 2 pgs.
English Translation of Notice of Rejection dated Jan. 8, 2013, JP Patent Application No. 2009549120, 4 pgs.
English Translation of Notice of Rejection dated Dec. 18, 2012, JP Patent Application No. 2009549112, 2 pgs.
Notice of Rejection dated May 7, 2012, MX Application No. MX/a/2008/016101, 4 pgs.
English Translation of Notice of Rejection dated Oct. 29, 2012, MX Application No. MX/a/2008/016101, 4 pgs.
English Translation of Notice of Rejection dated Aug. 21, 2012, JP Application No. 2009-515535, 4 pgs.
European Search Report; European Application No. 09746918.3; European Filing Date: May 4, 2009; Date of Mailing: Apr. 4, 2012; 13 pages.
Notice of Rejection regarding EP App. No. 08725331.6-1755; dated Mar. 27, 2013; 5 pgs.
Extended European Search Report for related App. No. 087253316.6-1264 dated Mar. 18, 2011, 8 pgs.
Office Action regarding related JP App. No. 2009-549120; dated Aug. 6, 2013; 3 pgs.

* cited by examiner

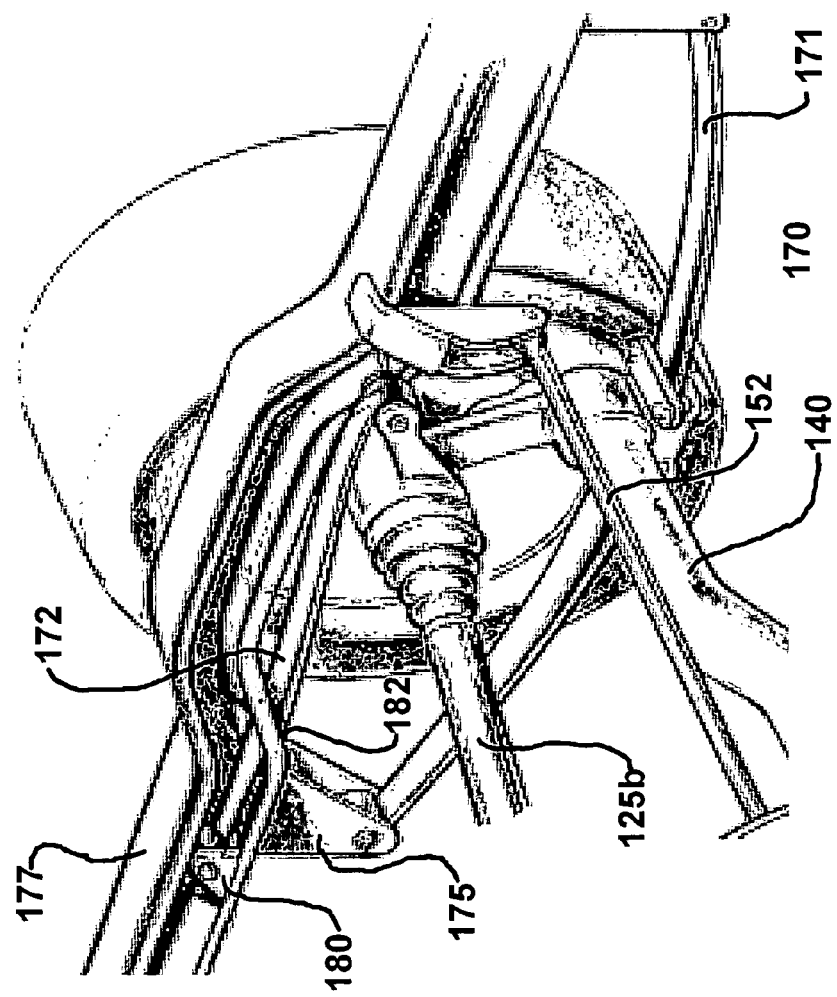

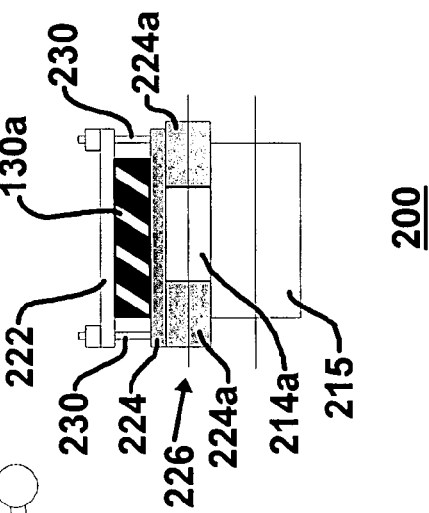
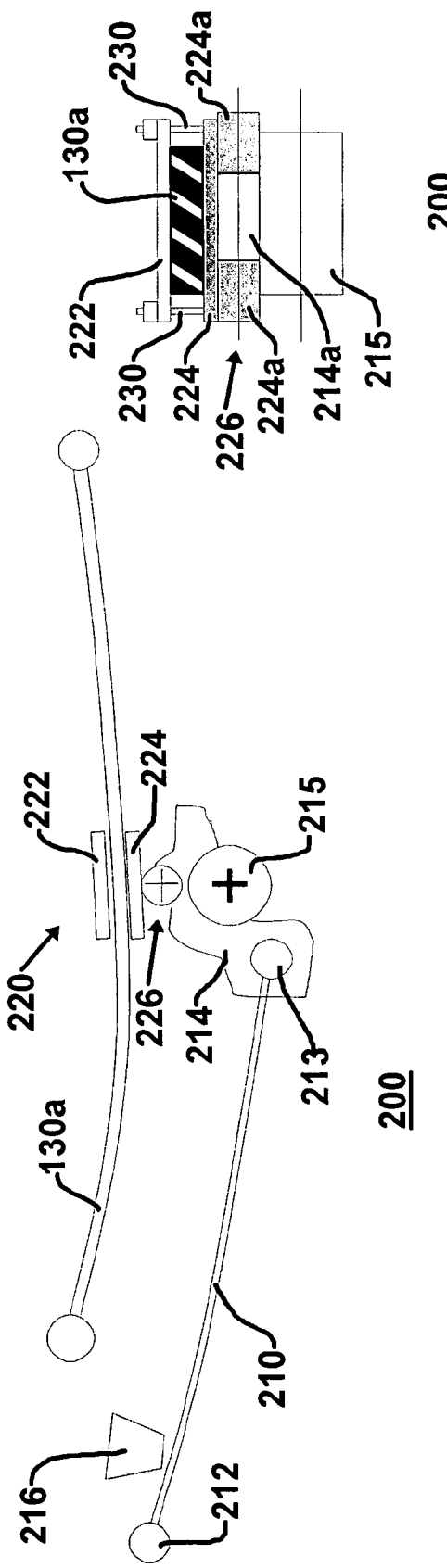
Fig. 4a
Fig. 4b

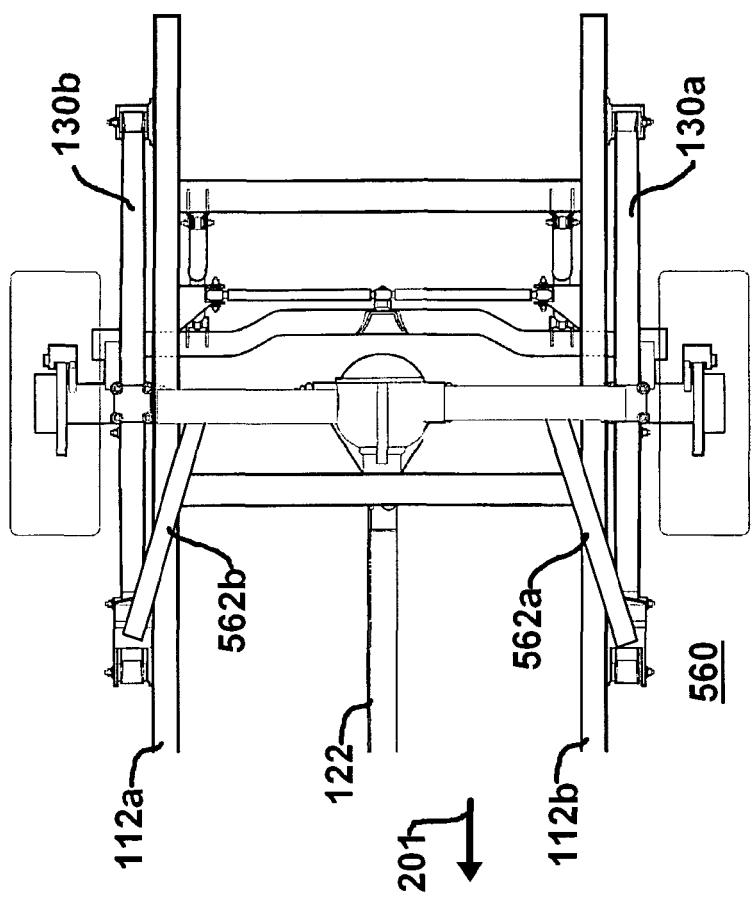

SEPARATED PRIMARY SPRING AND SECONDARY LEAF SUSPENSION FOR VEHICLE

REFERENCE TO OTHER APPLICATIONS

This application is a US national stage filing under 35 U.S.C. §371 of International Application No. PCT/US2008/001685 filed on Feb. 7, 2008 and claims the benefit under 35 U.S.C. §119(e) of U.S. Provisional Patent Application Ser. No. 60/900,796 filed on Feb. 7, 2007; U.S. Provisional Patent Application Ser. No. 60/921,881 filed on Apr. 3, 2007; and U.S. Provisional Patent Application Ser. No. 60/994,779 filed Sep. 21, 2007, and is a continuation-in-part of International Patent Application Serial Number PCT/US2007/014290, filed on Jun. 18, 2007, designating the United States, now pending in the United States as a national stage filing under 35 U.S.C. §371 as U.S. Ser. No. 12/308,481. International Application No. PCT/US2007/014290 claims the benefit under 35 U.S.C. §119(e) of Provisional Patent Application Ser. No. 60/814,518, filed on Jun. 18, 2006. The disclosures in these patent applications are incorporated herein by reference.

BACKGROUND OF THE INVENTION

1. Field of the Invention

This invention relates generally to suspension systems for vehicles, and more particularly, to a leaf suspension arrangement that is useable with independent and semi-independent suspension systems.

2. Description of the Related Art

Leaf spring systems have for many years been used for the suspension of wheeled vehicles. The central element of a leaf spring suspension system for a vehicle is termed a "semi-elliptical" spring configured as an arc-shaped length of spring steel having a rectangular cross-section. At the center of the arc is provided an arrangement for coupling to the axle of the vehicle. At the ends are provided coupler holes for attaching the spring to the vehicle body. For heavy vehicles, leaf springs are stacked on one other to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point.

The well-known Hotchkiss drive, the name of which derives from the French automobile firm of Hotchkiss, employs a solid axle that is coupled at its ends to the centers of respective semi-elliptical leaf springs. There are a number of problems with this form of drive arrangement. First, this drive system is characterized by high unsprung mass. Additionally, the use of a solid axle results in coupled left/right wheel motion. During heavy cornering and fast acceleration, this known system suffers from vertical deflection and wind-up.

One prior art effort to address the problems associated with the Hotchkiss system employs a parallel leaf spring arrangement at each end of a solid axle. This known arrangement affords increased axle control, in the form of reduced power hop. Other advantages of this known arrangement include roll under steer, auto load leveling and the gross vehicle weight, and no frame changes are required to convert from a Hotchkiss system. However, the known parallel leaf spring arrangement employs a solid axle, and therefore does not provide the benefits of independent suspension. In addition, this known arrangement is plagued with the disadvantage of high unsprung mass.

A de Dion tube vehicle suspension arrangement is a form of semi-independent suspension and constitutes an improvement over the Hotchkiss drive. In this type of suspension, universal joints are employed at the wheel hubs and the differential, and there is additionally provided a solid tubular beam that maintains the opposing wheels in parallel. The de Dion tube is not directly connected to the chassis and is not intended to flex.

The benefits of a de Dion suspension include a reduction in the unsprung weight compared to the Hotchkiss drive. This is achieved by coupling the differential to the chassis. In addition, there are no camber changes during suspension unloading. Since the camber of both wheels is set at zero degrees, the traction from wide tires is improved, and wheel hop under high power operations is reduced compared to an independent suspension. However, the de Dion tube adds unsprung weight.

It is, therefore, an object of this invention to provide a vehicle suspension arrangement that provides the benefits of independent suspension while using leaf spring technology.

It is another object of this invention to provide a vehicle suspension arrangement that employs leaf spring technology and yet affords reduced unsprung mass for reduced inertial effects and improved vehicle handling response.

It is also an object of this invention to provide a vehicle suspension arrangement that employs leaf spring technology and affords reduced suspension inertia.

It is a further object of this invention to provide a vehicle suspension arrangement that employs leaf spring technology and affords reduced noise, vibration, and harshness (NVH).

It is additionally an object of this invention to provide a vehicle suspension arrangement that employs leaf spring technology and affords reduced lateral wheel shake.

It is yet a further object of this invention to provide a vehicle suspension arrangement that employs leaf spring technology and affords reduced side view wind-up at the axle bracket.

It is also another object of this invention to provide a vehicle suspension arrangement that employs leaf spring technology and affords reduced forward and rearward movement.

It is yet an additional object of this invention to provide a vehicle suspension arrangement that employs leaf spring technology and affords a semi-independent suspension effect during asymmetric wheel travel.

It is yet an additional object of this invention to provide a vehicle suspension arrangement that employs leaf spring technology in combination with a coil spring element.

SUMMARY OF THE INVENTION

The foregoing and other objects are achieved by this invention which provides a vehicle suspension arrangement for a vehicle of the type having a chassis rail and a longitudinal axle arranged substantially orthogonal to the chassis rail. In accordance with the invention, the vehicle suspension arrangement is provided with a primary leaf spring having a plan view longitudinal configuration and a first end for pivotally coupling to the chassis of the vehicle at a first primary pivot coupling, and a distal second end for pivotally coupling to the chassis of the vehicle at a second primary pivot coupling. There is additionally provided a secondary leaf spring having a plan view longitudinal configuration, a first end for pivotally coupling to the chassis of the vehicle at a secondary pivot coupling, and a second end for coupling to the axle. The plan view longitudinal configuration of the secondary leaf spring is arranged to be angularly displaced with respect to the plan view longitudinal configuration of the primary leaf spring. In addition, the first primary pivot coupling and the secondary pivot coupling being arranged to be substantially coplanar.

In one embodiment, the primary leaf spring and the second end of the secondary leaf spring each communicate with respective upper portions of the axle at respective longitudinal regions of the axle. Also, the plan view longitudinal configuration of the secondary leaf spring is arranged substantially parallel to a chassis frame rail of the vehicle.

In a further embodiment, there is provided a fulcrum for communicating with the secondary leaf spring. In a specific illustrative embodiment of the invention, the fulcrum is formed of an active material having a configurable resilience characteristic. preferably, the resilience characteristic of the fulcrum is configurable in response to the application of electrical energy thereto.

In a still further embodiment of the invention, the fulcrum is actively displaceable along the secondary leaf spring. In some embodiments, there is provided a drive arrangement for displacing the fulcrum along the secondary leaf spring. The drive arrangement may be electrically actuated, or in other embodiments, hydraulically operated. The fulcrum is, in some embodiments, supported by a fulcrum carrier that supports the fulcrum and is coupled to the chassis of the vehicle.

In accordance with a further aspect of the invention, there is provided a vehicle suspension arrangement for a vehicle of the type having a chassis rail and a longitudinal axle arranged substantially orthogonal to the chassis rail. The vehicle suspension arrangement is provided with a primary leaf spring having a plan view longitudinal configuration and a first end for pivotally coupling to the chassis of the vehicle at a first primary pivot coupling, and a distal second end for pivotally coupling to the chassis of the vehicle at a second primary pivot coupling. There is additionally provided a primary leaf spring coupler for coupling the primary leaf spring to a first upper region of the axle. A secondary leaf spring having a plan view longitudinal configuration, has a first end for pivotally coupling to the chassis of the vehicle at a secondary pivot coupling, and a second end for coupling to the axle. Additionally, a secondary leaf spring coupler couples the secondary leaf spring to a second upper region of the axle, the second upper region of the axle being longitudinally inward with respect to the first upper region. The plan view longitudinal configuration of the secondary leaf spring is arranged to be angularly displaced with respect to the plan view longitudinal configuration of the primary leaf spring, and the first primary pivot coupling and the secondary pivot coupling are arranged to be substantially coplanar.

In one embodiment of this further aspect of the invention, there is additionally provided a height adjustment arrangement for varying a distance between the first end of the secondary leaf spring and the chassis of the vehicle.

In a further embodiment, there is provided a fulcrum for changing a spring rate characteristic of the secondary leaf spring. As previously noted, the fulcrum is, in some embodiments of the invention, actively displaceable along the secondary leaf spring. There is additionally provided in other embodiments a drive arrangement for displacing the fulcrum along the secondary leaf spring. Such a drive arrangement may be actuated electrically or hydraulically. Also as noted, the fulcrum in some embodiments is supported by a fulcrum carrier that supports the fulcrum and is coupled to the chassis of the vehicle.

In accordance with yet another aspect of the invention, there is provided a vehicle suspension arrangement for a vehicle of the type having a chassis rail and a longitudinal axle arranged substantially orthogonal to the chassis rail. The vehicle suspension arrangement has a primary spring that has a predetermined resilience characteristic, a first portion for coupling to the chassis of the vehicle at a primary coupling, and a second portion for coupling to the longitudinal axle. A secondary leaf spring has a plan view longitudinal configuration, a first end for pivotally coupling to the chassis of the vehicle at a secondary pivot coupling, and a second end for coupling to the longitudinal axle. The plan view longitudinal configuration of the secondary leaf spring is arranged to be angularly displaced with respect to the plan view longitudinal configuration of the primary leaf spring, and the first primary pivot coupling and the secondary pivot coupling are arranged to be substantially coplanar.

In one embodiment of this yet other aspect of the invention, there is provided a pivot coupling arrangement disposed intermediate of the second portion of the secondary leaf spring and the longitudinal axle. The pivot coupling arrangement permits a further degree of motion that reduces system internal loading on the pivot joint arrangement and leaf spring elements.

In a further embodiment, there is provided a fulcrum for communicating with the secondary leaf spring at a fulcrum point in a region of the secondary leaf spring intermediate of the first and second ends. A fulcrum displacement arrangement serves in some embodiments to vary the fulcrum point within the region of the secondary leaf spring intermediate of the first and second ends.

In an embodiment of the invention wherein the primary spring is a primary leaf spring having a plan view longitudinal configuration, the first portion of the primary leaf spring is a first end for pivotally coupling to the chassis of the vehicle at a first primary pivot coupling. A further end distal from the first end pivotally couples to the chassis of the vehicle at a second primary pivot coupling. The second portion for coupling to the longitudinal axle is arranged intermediate of the first an further ends of the primary leaf spring.

In an advantageous embodiment of the invention, there is provided a pivot coupling arrangement disposed intermediate of the second portion of the primary leaf spring and the longitudinal axle.

In accordance with a still further embodiment of the invention, the primary spring is a primary coil spring. The first portion of the primary coil spring is a first end for coupling to the chassis, and the second portion a second end of the primary coil spring that is disposed axially distal from the first end for coupling to the longitudinal axle.

BRIEF DESCRIPTION OF THE DRAWING

Comprehension of the invention is facilitated by reading the following detailed description, in conjunction with the annexed drawing, in which:

FIG. 3 is a perspective representation of a further specific illustrative embodiment of the invention;

FIGS. 4a and 4b are respective side plan and partially cross-sectional front plan simplified schematic illustrations of a rotary joint arrangement constructed in accordance with the principles of the invention;

FIG. 12 is a simplified schematic top plan representation of a splayed suspension arrangement constructed in accordance with the invention wherein secondary leaf springs are shown to be mounted at angles with respect to the primary leaf springs;

DETAILED DESCRIPTION

Figure 1:
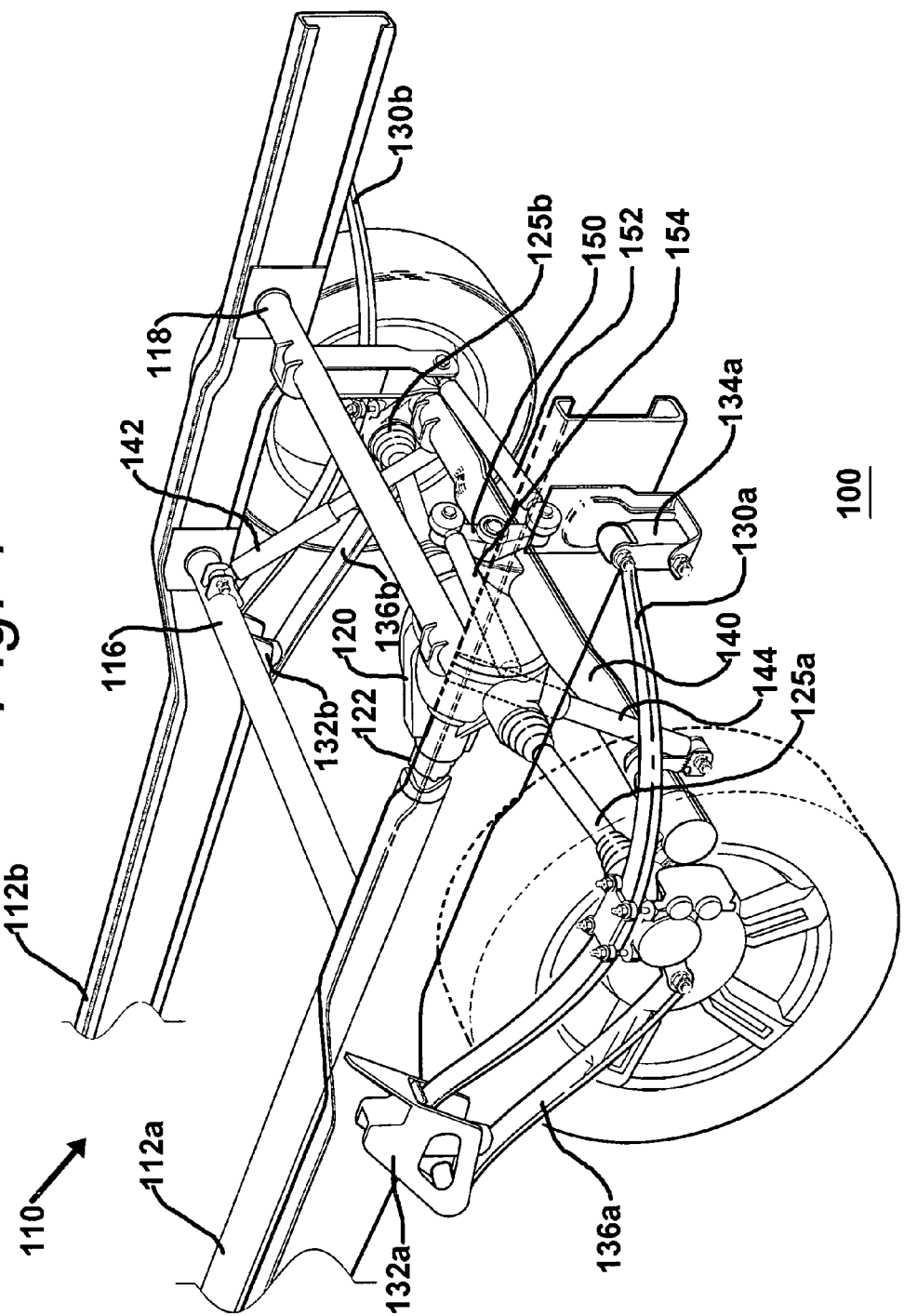
FIG. 1 is a perspective representation of a specific illustrative embodiment of the invention.

FIG. 1 is a perspective representation of a specific illustrative embodiment of the invention. As shown in this figure, a vehicle suspension system 100 has a chassis that is generally designated as chassis 110. The chassis has a pair of substantially parallel chassis rails 112a and 112b that are coupled to one another by cross-braces 116 and 118.

A differential drive arrangement 120 is fixedly coupled to the chassis and converts the rotatory motion of a drive shaft 122 to substantially orthogonal rotatory motion at half shafts 125a and 125b. Each half shaft has an associated pair of universal joints (not specifically designated) that are arranged to be proximal and distal with respect to the differential drive arrangement. Thus, the half shafts, each of which has an associated longitudinal axis (not shown), accommodate transaxial motion, particularly by operation of the proximal universal joints.

Half shafts 125a and 125b are shown to be coupled at their distal ends to respective leaf springs 130a and 130b. Referring to leaf spring 130a, for example, the leaf spring is, in this specific illustrative embodiment of the invention, pivotally coupled at its forward end to a bracket 132a. At its rearward end, leaf spring 130a is pivotally coupled to a link 134a. As shown in this figure, there is additionally provided a half leaf spring 136a that is also, in this specific illustrative embodiment of the invention, coupled at its forward end to bracket 132a. At its rearward end, half leaf spring 136a is coupled to the distal end of half shaft 125a. Half leaf spring 136a is shown in this specific illustrative embodiment of the invention, to engage a fulcrum 133a.

There is additionally provided a transverse beam 140 that is coupled to cross-brace 116 by a damper 142 and to cross-brace 118 by a further damper 144. Transverse beam 140 has installed thereon a pivoting member 150 to which are attached link elements 152 and 154. The link elements are attached, via brackets (not specifically designated), to cross-brace 118.

Figure 2:
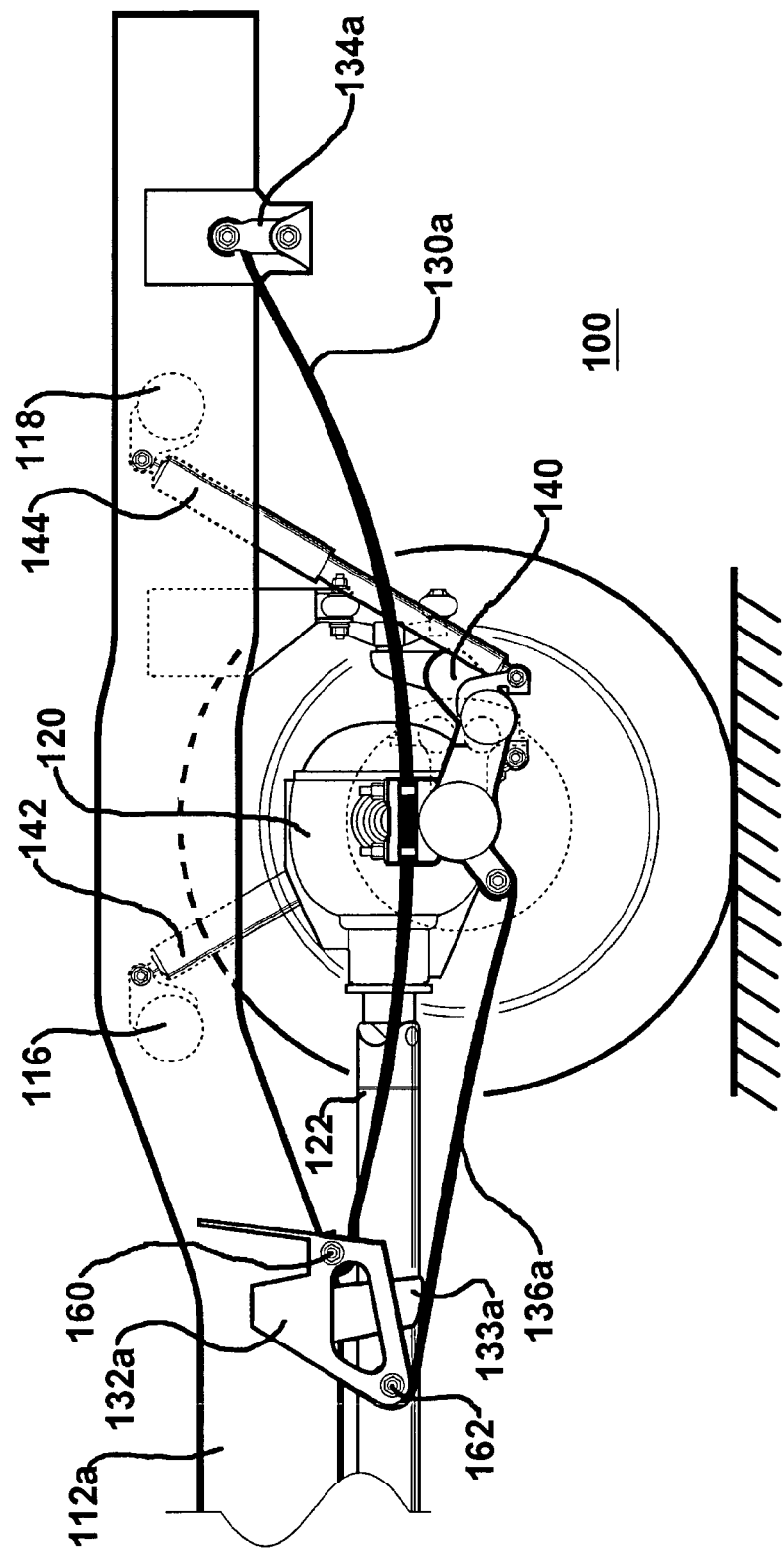
FIG. 2 is a side plan view of the embodiment of FIG. 1.

FIG. 2 is a side plan view of the embodiment of FIG. 1 of vehicle suspension system 100. Elements of structure that have previously been discussed are similarly designated. As shown in this figure, leaf spring 130a and half leaf spring 136a are each coupled at their respective forward ends to bracket 132a. Leaf spring 130a is pivotally coupled at a pivot 160, and half leaf spring 136a is pivotally coupled at a pivot 162, at bracket 132a. In this specific illustrative embodiment of the invention, pivots 160 and 162 are fixed on bracket 132a, which is fixed in relation to chassis rail 112a. In other embodiments, and as will be described below, there is provided a mechanism (not shown in this figure) that displaces bracket 132a, and in some embodiments, only pivot 162, in relation to chassis rail 112a. Such displacement of the pivots enables advantageous adjustment of the combined spring rate of leaf spring 130a and half leaf spring 136a. Additionally, such displacement is useful to adjust the height of the vehicle (not shown) while stopped, illustratively to facilitate loading and unloading of cargo and passengers (not shown).

FIG. 3 is a perspective representation of a further specific illustrative embodiment of the invention. Elements of structure that have previously been discussed are similarly designated. As shown in this figure, a vehicle suspension system 170 has a leaf spring 171 and a half leaf spring 172. In contrast to the embodiment of FIGS. 1 and 2, leaf spring 171 is arranged to be coupled to the underside of half shaft 125b. Half leaf spring 172 is coupled above half shaft 125b.

Leaf spring 171 is, in this specific illustrative embodiment of the invention, coupled to a bracket 175. Half leaf spring 172 is coupled to chassis rail 177 at a bracket 180. Bracket 180 is shown to be disposed within chassis rail 177. It is particularly noteworthy that in this embodiment half leaf spring 172 is arranged to extend through chassis rail 177 at a fulcrum point 182. The arrangement of this embodiment advantageously reduces the extent to which the leaf suspension system is visible when installed on a vehicle.

FIGS. 4a and 4b are respective side plan and partially cross-sectional front plan simplified schematic illustrations of a rotary joint arrangement 200 constructed in accordance with the principles of the invention. Elements of structure that bear analogous correspondence to elements of structure that have previously been discussed are similarly designated in this figure. Referring to FIG. 4a, it is seen that there is provided a leaf spring 130a that, in this specific illustrative embodiment of the invention, is pivotally coupled at its forward and rear ends, as previously described. There is additionally provided a half leaf spring 210 that is also, in this specific illustrative embodiment of the invention, pivotally coupled at a pivot mount 212 at its end distal to a further pivotal mounting 213 at a coupling member 214. The coupling member is itself coupled to axle shaft 215. Half leaf spring 210 is shown in this specific illustrative embodiment of the invention to engage a fulcrum 216.

FIG. 4a further illustrates a pivot link mounting arrangement 220 wherein leaf spring 130a is securely clamped between clamping member 222 and 224, as will be described below in relation to FIG. 4b. Referring once again to FIG. 4a, clamping member 224 is coupled to a pivot joint 226 that is itself engaged with coupling 214. This arrangement permits a further degree of motion that reduce system internal loading on the pivot joint arrangement and leaf spring elements.

FIG. 4b is a partially cross-sectional front plan simplified schematic illustrations of rotary joint arrangement 200 constructed in accordance with the principles of the invention. Elements of structure that bear analogous correspondence to elements of structure that have previously been discussed are similarly designated in this figure. It is seen in this figure that leaf spring 130a (shown cross-sectionally) is securely clamped between clamping members 222 and 224 by operation of bolts 230.

Pivot joint 226 is shown in FIG. 4b to be formed of two pivot sections, 214a and 224a. More specifically, pivot section 214a is coupled to coupling 214 (not specifically designated in this figure), and pivot section 224a is coupled to clamping member 224. The pivot sections in this specific illustrative embodiment of the invention, are pivotally engaged in this embodiment of the invention in a hinge-like manner. Therefore, in this embodiment, the pivotal motion is directed longitudinally in see-saw like fashion of leaf spring 130a.

Figure 5A:
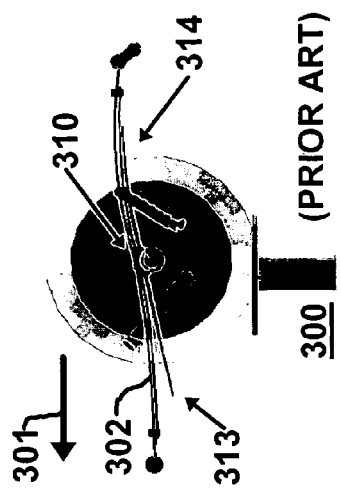
FIGS. 5a and 5b are simplified representations of a suspension system constructed in accordance with the principles of the invention (FIG. 5a) and a prior art suspension arrangement (FIG. 5b), both in a simulated static acceleration condition.
Figure 5B:
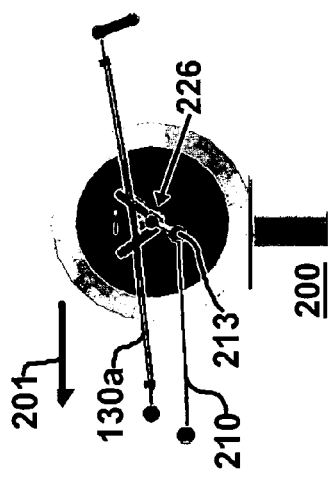

FIGS. 5a and 5b are simplified representations of a suspension system 200 constructed in accordance with the principles of the invention (FIG. 5a) and a prior art suspension arrangement 300 (FIG. 5b), illustratively a conventional parallel leaf suspension, both represented in computer-simulated static acceleration conditions. Elements of structure that have previously been discussed are similarly designated in this figure. FIGS. 5a and 5b are situated next to one another for sake of facilitating comparison of the effect of acceleration. It is seen that the prior art embodiment of FIG. 5b does not comprise the structural equivalent of half leaf spring 210 shown in FIG. 5a.

As can be seen in FIG. 5a, leaf spring 130a remains essentially without distortion during simulated vehicle acceleration as the vehicle (not shown) travels in the direction shown by arrow 201. Prior art suspension arrangement 300, on the other hand, shows during the simulated vehicle acceleration in the direction of arrow 301 a distortion in leaf spring 302 wherein region 313 of leaf spring 302 is distorted downward and region 314 is distorted upward. This condition, which is commonly referred to as "side view windup," results in the unacceptable condition of power hop during acceleration, as well as a disadvantageous reduction in axle control.

Figure 6A:
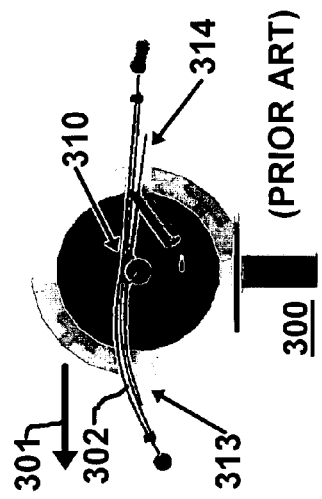
FIGS. 6a and 6b are simplified representations of the suspension system constructed in accordance with the principles of the invention of FIG. 5a and a prior art suspension arrangement of FIG. 5b, both in a simulated static braking condition.
Figure 6B:
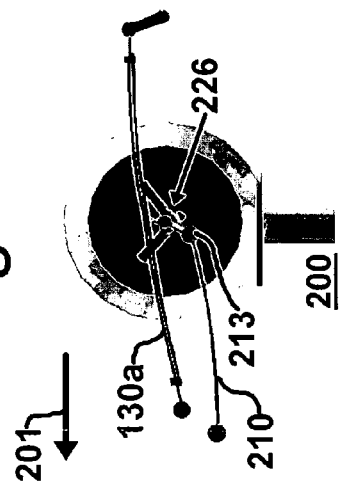

FIGS. 6a and 6b are simplified representations of suspension system 200 of FIG. 5a and prior art suspension arrangement 300 of FIG. 5b, both in computer-simulated static braking conditions. Elements of structure that have previously been discussed are similarly designated in this figure. As shown in FIG. 6a, leaf spring 130a remains substantially in its base line configuration during simulated acceleration in the direction of arrow 201. FIG. 6b, on the other hand, shows leaf spring 302 to undergo significant side view windup. Region 313 of leaf spring 302 is distorted upward significantly, while region 314 is distorted downward. When leaf spring 302 is wound up as shown in this simulation, its spring rate is changed significantly, as well as other suspension parameters, resulting in reduced control, particularly when braking is performed on an uneven or bumpy surface (not shown).

Figure 7:
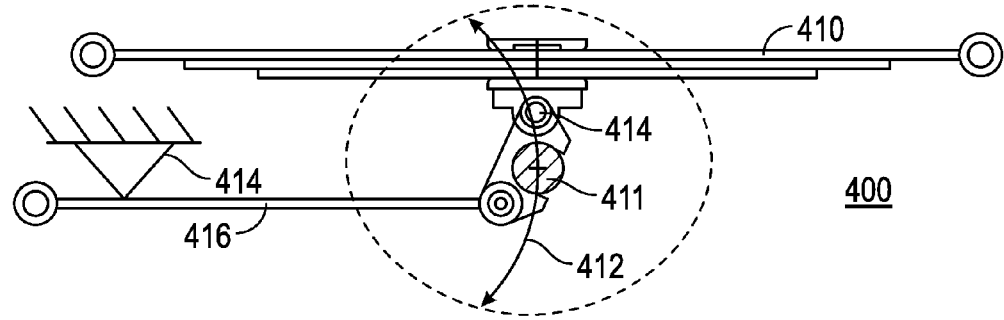
FIG. 7 is a simplified schematic representation of a side view of a suspension system constructed in accordance with the principles of the invention with a 1$^{st}$ stage leaf spring, and further showing the wheel center path, with a fulcrum arranged to communicate with the 2$^{nd}$ stage lower leaf.

FIG. 7 is a simplified schematic representation of a side view of a suspension system 400 constructed in accordance with the principles of the invention with a $1^{st}$ stage leaf spring 410, and further showing the path of the center of axle 411, as indicated by curved arrow 412 with a fulcrum 414 arranged to communicate with $2^{nd}$ stage lower leaf spring 416. The embodiment of the invention represented in this figure is pivotally coupled to $1^{st}$ stage leaf spring 410 at a pivot coupling 414.

Figure 8:
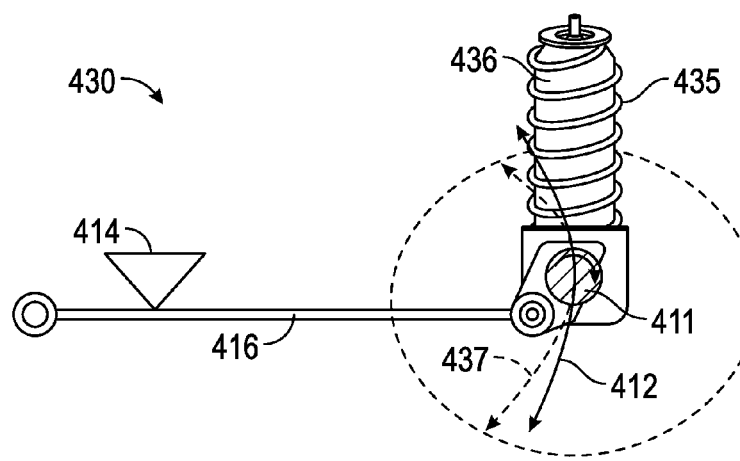
FIG. 8 is a simplified schematic representation of a side view of a suspension system constructed in accordance with the principles of the invention with a 1$^{st}$ stage consisting of a substantially equivalent coil spring, or air spring, with the fulcrum of the 2$^{nd}$ stage lower leaf removed.

FIG. 8 is a simplified schematic representation of a side view of a suspension system 430 constructed in accordance with the principles of the invention. Elements of structure that previously have been discussed are similarly designated in this figure. In this figure, there is illustrated a $1^{st}$ stage consisting of a coil spring 435, which may, in certain embodiments be replaced by a conventional air spring (not shown). In still further embodiments of the invention, coil spring 435 may constitute a combination of a coil spring and a helper air spring 436, as shown. The helper air spring, in the embodiment of this figure is contained within the coil spring. In other embodiments, however, an air spring can be used as the $1^{st}$ stage. In the embodiment of this figure, coil spring 435 is substantially equivalent in function to $1^{st}$ stage leaf spring 410 of the embodiment of FIG. 7. However, as will be noted below, the use of a coil spring results in a variation in the path of the axle.

Fulcrum 414 of the $2^{nd}$ stage lower leaf has been removed, but it is nevertheless illustrated in phantom representation to show that its use is optional in this specific illustrative embodiment of the invention. Its use will depend on the geometric needs of the vehicle (not shown).

In this embodiment, the path of center of axle 411 is indicated by curved arrow 437. Curved arrow 412, which represents the path of the center axle in the embodiment of FIG. 7, is shown in this figure for comparison purposes.

A significant aspect of this specific illustrative embodiment of the invention is that lower leaf spring 440 is configured as a lower link subcomponent that allows a measure of compliance. It is not a rigid link.

Figure 9:
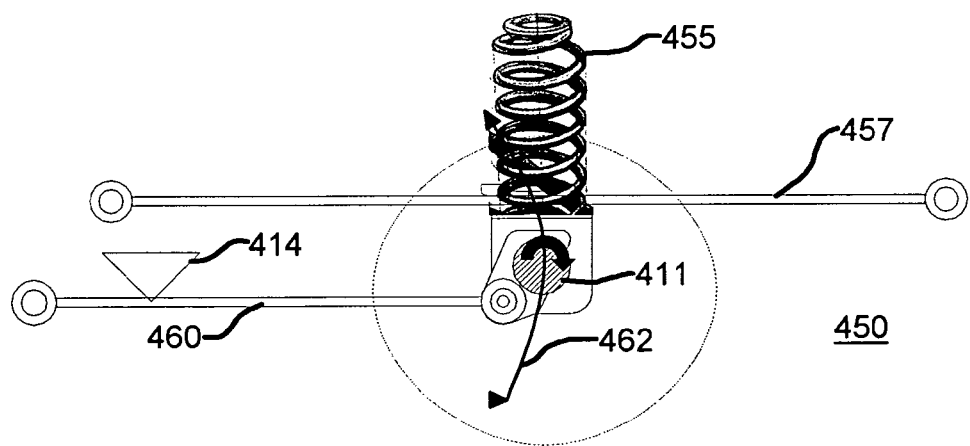
FIG. 9 is a simplified schematic representation of a side view of a suspension system constructed in accordance with the principles of the invention with a 1$^{st}$ stage consisting of a coil spring or air spring, with an optional fulcrum arranged to communicate with the secondary stage lower leaf, and further showing an optional locating spring plate in the 1$^{st}$ stage.

FIG. 9 is a simplified schematic representation of a side view of a suspension system 450 constructed in accordance with the principles of the invention with a $1^{st}$ stage consisting of a substantially equivalent coil spring 455, which in some embodiments of the invention may be an air spring or a combination of a coil spring and an air spring or a helper air spring, as discussed hereinabove in relation to FIG. 8. Referring to FIG. 9, coil spring 455 provides vertical load support in place of $1^{st}$ stage leaf spring 410 shown in FIG. 7. However, in this specific illustrative embodiment of the invention, added control is achieved by the use of an optional single plate main leaf spring 457 as part of the $1^{st}$ stage with coil spring 455. A lower leaf 460 of the $2^{nd}$ stage is employed for additional control. In this embodiment, lower leaf 460 permits a measure of compliance and is not a rigid link.

Again, Fulcrum 414 of the $2^{nd}$ stage lower leaf has been removed, but is illustrated in phantom representation to show that its use is optional in this specific illustrative embodiment of the invention. Its use will depend on the geometric needs of the vehicle (not shown).

In this specific illustrative embodiment of the invention, the center of axle 411 travels along a path that conforms to curved arrow 462, as seen in the present side view.

Figure 10:
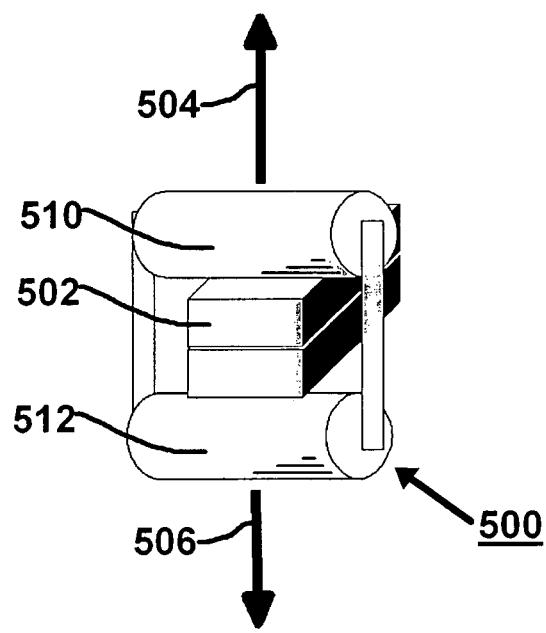
FIG. 10 is a simplified schematic representation of a clip bracket that can be used to push or pull the main spring or the secondary stage.

FIG. 10 is a simplified schematic representation of a clip bracket 500 that can be used to push or pull a stack of spring plates 502. Spring plates 502 may be the main spring or the secondary stage in the practice of the invention. In operation, clip bracket 500 is urged upward and downward in the direction of arrows 504 and 506, respectively. Spring plates 502 are contained between rubber bushings 510 and 512, to prevent damage to the spring plates. The operation of clip bracket 500 will be described below in relation to FIGS. 11a, 11b, and 11c.

Figure 11A:
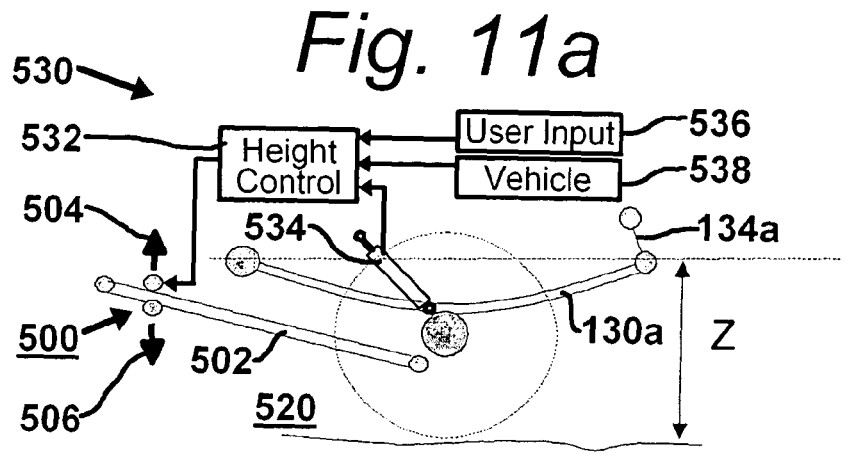
FIGS. 11a, 11b, and 11c are simplified schematic side view representations of a height control arrangement constructed in accordance with the invention that is useful in the loading and unloading of a stationary vehicle, FIG. 11a showing a simplified system control arrangement in block and line form.
Figure 11B:
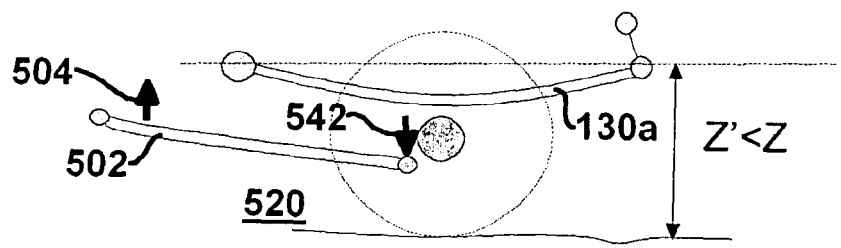
Figure 11C:
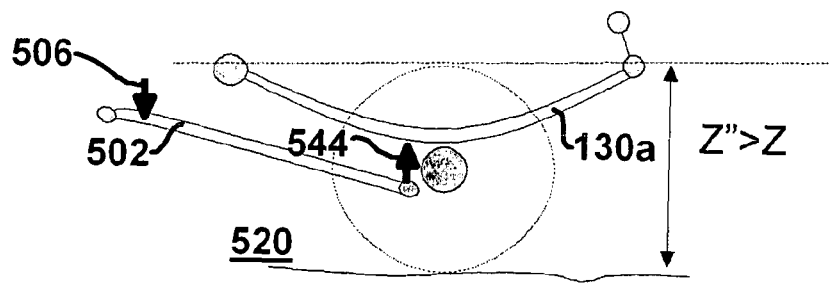

FIGS. 11a, 11b, and 11c are simplified schematic side view representations of a height control arrangement 520 constructed in accordance with the principles of the invention that is useful in the loading and unloading of a stationary vehicle, FIG. 11a showing a simplified system control arrangement in block and line form. Elements of structure that have previously been discussed are similarly designated in these figures.

As shown in FIG. 11a, a primary leaf spring 130a is coupled at its ends to a chassis rail (not specifically designated) as described in relation to FIGS. 1 and 2, above. Leaf spring 130a and secondary spring 502, which may be the equivalent of half leaf spring 136a described above, are coupled to the axle (not specifically designated in this figure). Moreover, although clip bracket 500 is shown in this specific illustrative embodiment of the invention, to operate on the secondary spring system, other embodiments can employ clip bracket 500 on the primary spring, i.e., primary leaf spring 130a. The principle is to provide a way literally push or pull on the spring assembly in a local area to force a temporary camber change. This translates into a change in the height "Z" of the vehicle (see, FIG. 15 and its corresponding description below) that can be selectively employed in response to the operation of a height control system that is generally designated as 530 in the figure.

Height control system 530 includes a height control system 532 that receives vehicle height information from a height sensor 534. A desired vehicle height is entered by a user (not shown) at user input 536. In a simple embodiment of the invention, user input 536 may constitute a simple pair of switches (not shown) that enable the user to raise or lower the vehicle height as desired. In other embodiments, user input 536 may constitute a programmable arrangement (not shown) wherein several vehicle heights and other conditions can be preprogrammed. In response to the data received at user input 536 and the corresponding height data received from height sensor 534, height control system 532 operates an electrical or hydraulic system (not shown) that exerts a force on clip bracket 500 whereby the clip bracket is urged upward or downward, as the case may be, in the direction of arrows 504 and 506, respectively, relative to the chassis rail. In this embodiment of the invention, clip bracket 500 can only exert force on secondary spring 502 statically and must be withdrawn to a baseline condition when the vehicle is in use to prevent damage to the spring. More specifically, the compression surface of the spring should not be loaded during dynamic or fatigue loading, and secondary spring 502 should therefore be employed only statically, such as for loading and unloading the vehicle. For this reason, this specific illustrative embodiment of the invention is provided with a vehicle interface 538 that, among other functions, disables the operation of height control system 532 when vehicle motion is detected.

If the vehicle is lightly loaded, a height sensor 534 provides vehicle height data that indicates that clip bracket 500 must pull on secondary spring 502 such that vehicle trim position is lowered. This allows the vehicle to be loaded more easily by the user. In some embodiments of the invention, when the vehicle is shifted to the "drive" position, vehicle interface 538 instructs height control system 532 to restore the height of the vehicle to a predetermined baseline position to avoid creating a rise in the operational stress applied to secondary spring 502.

Referring to FIG. 11b, it is noted that as the clip bracket (not specifically designated in this figure) is urged upward in the direction of arrow 504, the vehicle height is reduced from the baseline of Z to Z', where Z'<Z. As the clip bracket urges secondary spring 502 upward, a downward force 542 is applied at the distal end of secondary spring 502.

In FIG. 11c, the clip bracket (not specifically designated in this figure) is urged downward in the direction of arrow 506, the vehicle height is increased from the baseline of Z to Z", where Z">Z. As the clip bracket urges secondary spring 502 upward, an upward force 544 is applied at the distal end of secondary spring 502.

FIG. 12 is a simplified schematic top plan representation of a splayed suspension arrangement 560 constructed in accordance with the invention wherein secondary leaf springs 562a and 562b are shown to be mounted at angles with respect to respective ones of primary leaf springs 130a and 130b. Elements of structure that have previously been discussed are similarly designated in this figure. The secondary leaf springs are not parallel to the respective primary leaf springs, as is the case in the embodiments of FIGS. 1 and 2. In a practical embodiment of the invention, angles of deviation for the secondary leaf springs will be on the order of 5°-10°. Of course, the present invention is not limited to this angular range, which can be determined in response to finite element and kinematic analyses as will be discussed below.

Further in relation to the embodiment of FIG. 12, it is noted that the addition of secondary leaf springs 562a and 562b, which are mounted in the system at an angle relative to primary leaf springs 130a and 130b, enhances axle control, as the present non-parallel arrangement emulates a rigid 4-link rear axle system (not shown). However, a key difference is that in the present system leaf springs 562a and 562b function as springs, not just rigid links. This significant difference allows for compliance that will affect all aspects of the dynamic and kinematic response, including axle wind-up and roll response. The angularly disposed secondary springs of this embodiment of the invention will increase roll stiffness significantly. The resulting stresses that are applied by this arrangement to the mounting plate (not specifically designated) can be balanced on a case-by-case basis using standard analytical systems, such as finite element analysis ("FEA"). Additionally, kinematic analysis performed using commercially available software, such as the ADAMS software, will on a case-by-case basis identify exact values for the vehicle response to roll inputs. Wheel sideslip and axle steer control are thereby improved.

Figure 13:
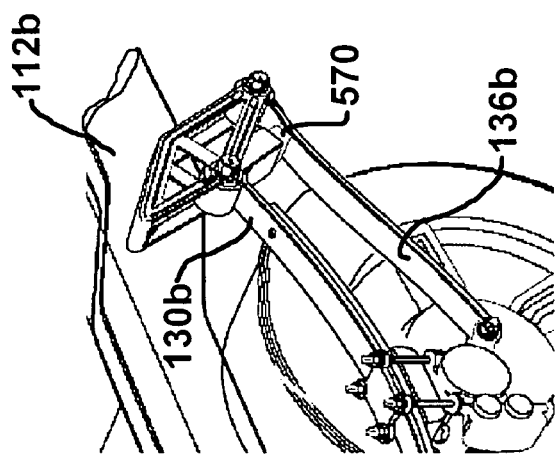
FIG. 13 is a simplified schematic perspective representation of a variable position fulcrum bumper constructed in accordance with the invention that may be active or passive to rotate in a controlled manner to create a variation in the stiffness of the secondary spring rate.

FIG. 13 is a simplified schematic perspective representation of a variable position fulcrum bumper 570 constructed in accordance with the invention that may be active or passive to rotate in a controlled manner to create a variation in the stiffness of the secondary spring rate. By allowing the fulcrum bumper (whether passive or active) to rotate in a controlled manner about the ground point on the frame bracket, a change in secondary plate stiffness is produced. Essentially, the bumper ground point at chassis rail 112*b* is rotated such that the point of contact on the secondary spring is moved. The resulting stiffness and kinematic effects are significantly affected. The specific value of the amounts of stiffness and kinematic effects is determined on a case-by-case basis with the use of kinematic modeling. Additionally, the resulting change in spring rate thereby calculated.

In the practice of this aspect of the invention, an electric motor (not shown) is mounted to the frame bracket (not specifically designated) and is actuated to cause the desired rotation after a signal sent from a height transducer identifies how much rotation is needed. A simplified height analysis system is described in relation to FIG. 11*a*. The displaceable fulcrum bumper herein described can be used in combination with a bumper having a variable stiffness, whereby numerous combinations of final stiffness and kinematic path result. In some embodiments of the invention, variable position fulcrum bumper 570 comprises a rheological material that changes viscosity or stiffness in response to the application of electrical energy. The stiffness of variable position fulcrum bumper 570 is the focus. By activating the fulcrum bumper to become more (or less) rigid, a desired change in supporting spring stiffness is effected and, correspondingly, the geometric and kinematic attributes of the suspension system are affected.

The fulcrum bumper is not limited to be used in combination with a rheological material, and can employ an air spring or other mechanical means to effect the engagement of the secondary stage leaf. Although in this embodiment of the invention there would be no "active" vehicle retrim, the system could "passively" allow for the rate change, which as a result of the linked kinematic geometry effect, would affect vehicle dynamic behavior in roll, acceleration, braking, or cornering motions. Once vehicle attitude is effected via suspension displacement activity, the secondary plate contact with the fulcrum bumper would initiate reaction forces. A variable rate bumper made of rubber, urethane, or like material that can be voided or otherwise manufactured to cause a nonlinear compression effect that will influence the secondary plate deflection character while under load, albeit to a lesser degree than an active system.

Figure 14:
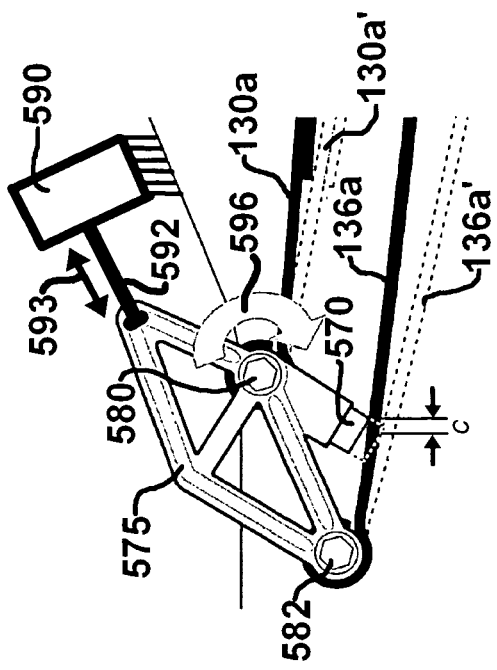
FIG. 14 is a simplified schematic plan representation of the variable position fulcrum bumper of FIG. 13.

FIG. 14 is a simplified schematic plan representation of the variable position fulcrum bumper of FIG. 13, that has been magnified to facilitate the illustration of certain details of its operation. It is seen in this figure that variable position fulcrum bumper 570 is installed on a carrier 575 that is configured to pivot about a pivot coupling 580 to which is also coupled primary leaf spring 130*a*. The carrier is coupled to half leaf spring 136*a* at pivot coupling 582. An electric drive arrangement 590 (shown schematically) is actuatable, illustratively in response to the system described in connection with FIG. 11*a*, to cause carrier 575 to be rotated about pivot coupling 580 in the direction of arrow 596. Electric drive arrangement 590 is coupled to carrier 575 by a drive coupler 592 that, in this specific illustrative embodiment of the invention, is urged in the directions of two-headed arrow 593. The actuation of the carrier by electric drive arrangement 590 causes variable position fulcrum bumper 570 to change the point at which it communicates with half leaf spring 136*a* over a range c, whereby half leaf spring 136*a* is displaced to position 136*a*′, and primary leaf spring 130*a* is displaced to position 130*a*′.

Figure 15:
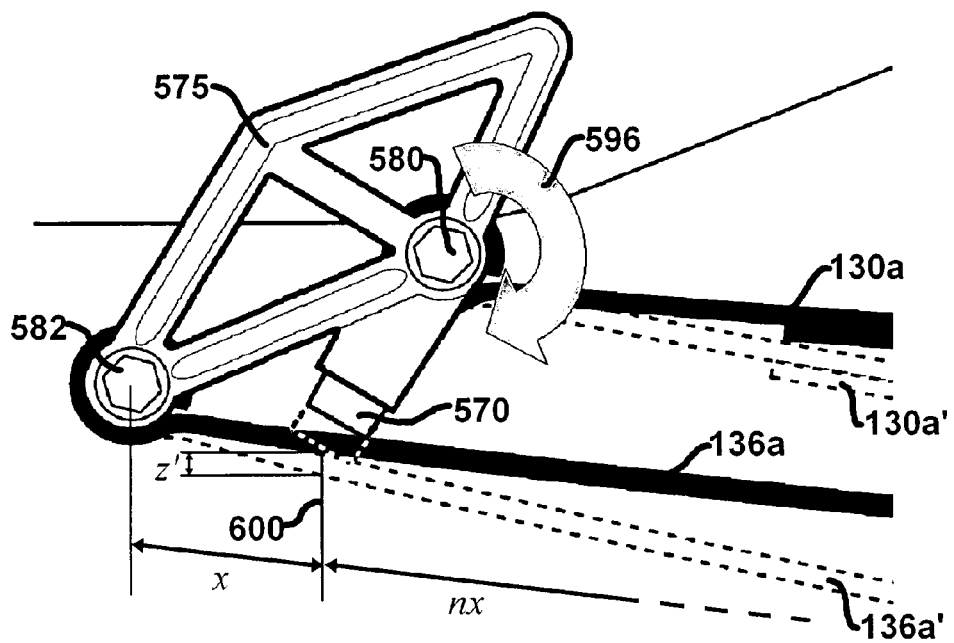
FIG. 15 is a simplified schematic representation of the variable position fulcrum bumper of FIG. 14 that is useful to illustrate the variation in vehicle height that is achievable, particularly when the vehicle (not shown) is stationary.

FIG. 15 is a simplified schematic representation of the variable position fulcrum bumper of FIG. 14 that is useful to illustrate the variation in vehicle height that is achievable, particularly when the vehicle (not shown) is stationary. Elements of structure that have previously been discussed are similarly designated in this figure. As shown in this figure, variable position fulcrum bumper 570 causes, as previously noted, half leaf spring 136*a* is displaced to position 136*a*′. This displacement is responsive to a displacement of z′ at the point identified by line 600. The height displacement of the vehicle corresponds substantially to the displacement z′ multiplied by the mechanical advantage nx/x, or n. In a typical vehicle, the value of n may be on the order of 6, and therefore the height of the vehicle will be lowered by approximately 6z′.

Figure 16:
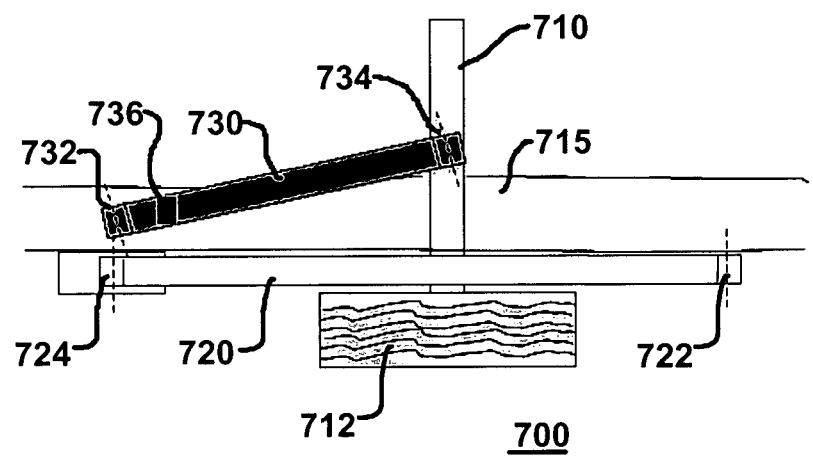
FIG. 16 is a simplified schematic plan view representation of a specific illustrative embodiment of a suspension arrangement that has a secondary helper stage leaf spring that is arranged at a predetermined angle with respect to the main stage leaf spring.

FIG. 16 is a simplified schematic plan view representation of a specific illustrative embodiment of a suspension arrangement 700 that, as shown in this figure, is provided with an axle 710 coupled to a wheel 712. The axle and wheel are associated with a vehicle (not shown) that has a chassis frame rail 715. a main stage leaf spring 720 is pivotally coupled to chassis frame rail 715 at a linkage arrangement 722 that is shown in greater detail in FIG. 17. Main stage leaf spring 720 is coupled to axle 710, illustratively in a conventional manner. Referring once again to FIG. 16 the end of main stage leaf spring 720 distal from linkage arrangement 722 is pivotally coupled to chassis frame rail 715 at pivot coupling 724.

There is additionally shown in FIG. 16 a second stage helper leaf spring 730 that is pivotally coupled at one end thereof by a pivot coupling 732 to chassis frame rail 715. The other end of second stage helper leaf spring 730 is coupled to axle 710 by a further pivot coupling 734. There is additionally provided a fulcrum 736 for effecting a secondary spring rate characteristic to second stage helper leaf spring 730. A significant aspect of this specific illustrative embodiment of the invention is that second stage helper leaf spring 730 is shown to be angularly displaced in this plan view with respect to main stage leaf spring 720. Thus, in the plan view of FIG. 16, There is seen a substantially triangular configuration formed amongst a portion of axle 710, approximately one-half of main stage leaf spring 720, and second stage helper leaf spring 730.

Figure 17:
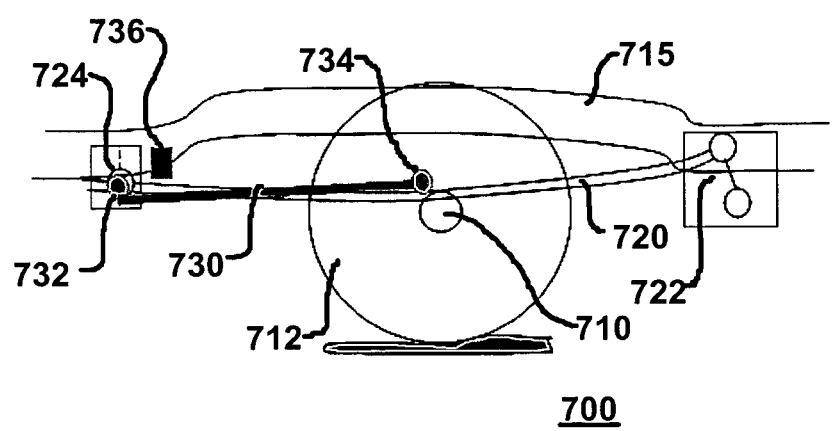
FIG. 17 is a simplified schematic side view representation of the embodiment of FIG. 16.

FIG. 17 is a simplified schematic side view representation of the embodiment of FIG. 16. Elements of structure that have previously been discussed are similarly designated in this figure. This figure shows that in this specific illustrative embodiment of the invention, both main stage leaf spring 720 and second stage helper leaf spring 730 are each pivotally coupled, at respectively associated ones of pivot couplings 724 and 732, to the underside of chassis frame rail 715. Moreover, such pivot couplings are substantially axially aligned.

Fulcrum 736 is shown to be installed in a separate mount from second stage helper leaf spring 730, and located under chassis frame rail 715. This arrangement assists in balancing the applied bending moment.

The angularly displaced relationship between main stage leaf spring 720 and second stage helper leaf spring 730 affords several advantages. In addition to simplifying system mounting over other dual leaf arrangements, the present invention improves system tuning for under steer effects. Moreover, the present system balances longitudinal dynamic twist that is applied to the frame of the vehicle (not shown) by both springs. As is evident in FIG. 16, the suspension system 700 provides significant improvement in the ground clearance entrance angle.

Although the invention has been described in terms of specific embodiments and applications, persons skilled in the art may, in light of this teaching, generate additional embodiments without exceeding the scope or departing from the spirit of the invention herein described. Accordingly, it is to be understood that the drawing and description in this disclosure are proffered to facilitate comprehension of the invention, and should not be construed to limit the scope thereof.

What is claimed is:

1. A vehicle suspension arrangement for a vehicle having a chassis rail and a transverse axle arranged substantially orthogonal to the chassis rail, the vehicle suspension arrangement comprising:
   a primary leaf spring having a plan view longitudinal configuration and a first end for pivotally coupling to the chassis rail of the vehicle at a first primary pivot coupling, and a distal second end for pivotally coupling to the chassis rail of the vehicle at a second primary pivot coupling; and
   a secondary leaf spring having a plan view longitudinal configuration, a first end for pivotally coupling to the chassis rail of the vehicle at a secondary pivot coupling, and a second end for coupling to the transverse axle;
   wherein the entire length of the plan view longitudinal configuration of said secondary leaf spring extends in a single substantially linear direction that is arranged to be angularly displaced with respect to the plan view longitudinal configuration of said primary leaf spring, the angular displacement of the secondary leaf spring relative to the primary leaf spring being from about 5 degrees to about 10 degrees, the first primary pivot coupling and the secondary pivot coupling being arranged to be substantially coplanar.

2. The vehicle suspension arrangement of claim 1, wherein said primary leaf spring and the second end of said secondary leaf spring each communicate with respective upper portions of the transverse axle at respective longitudinal regions of the transverse axle.

3. The vehicle suspension arrangement of claim 1, wherein the plan view longitudinal configuration of said secondary leaf spring is arranged substantially parallel to the chassis rail of the vehicle.

4. The vehicle suspension arrangement of claim 1, wherein there is further provided a fulcrum for communicating with said secondary leaf spring.

5. The vehicle suspension arrangement of claim 4, wherein said fulcrum is formed of an active material having a configurable resilience characteristic.

6. The vehicle suspension arrangement of claim 5, wherein the resilience characteristic of said fulcrum is configurable in response to the application of electrical energy thereto.

7. The vehicle suspension arrangement of claim 4, wherein said fulcrum is actively displaceable along said secondary leaf spring.

8. The vehicle suspension arrangement of claim 4, wherein there is further provided an electrical drive arrangement for displacing said fulcrum along said secondary leaf spring.

9. The vehicle suspension arrangement of claim 4, wherein there is further provided an hydraulic drive arrangement for displacing said fulcrum along said secondary leaf spring.

10. The vehicle suspension arrangement of claim 4, wherein there is further provided a fulcrum carrier for supporting said fulcrum, said fulcrum carrier is coupled to the chassis rail of the vehicle.

11. A vehicle suspension arrangement for a vehicle having a chassis rail and a transverse axle arranged substantially orthogonal to the chassis rail, the vehicle suspension arrangement comprising:
   a primary leaf spring having a plan view longitudinal configuration and a first end for pivotally coupling to the chassis rail of the vehicle at a first primary pivot coupling, and a distal second end for pivotally coupling to the chassis rail of the vehicle at a second primary pivot coupling;
   a primary leaf spring coupler for coupling said primary leaf spring to a first upper region of the transverse axle;
   a secondary leaf spring having a plan view longitudinal configuration, a first end for pivotally coupling to the chassis rail of the vehicle at a secondary pivot coupling, and a second end for coupling to the transverse axle;
   a secondary leaf spring coupler for coupling said secondary leaf spring to a second upper region of the transverse axle, the second upper region of the transverse axle being transversely inward with respect to the first upper region;
   wherein the entire length of the plan view longitudinal configuration of said secondary leaf spring extends in a single substantially linear direction that is arranged to be angularly displaced with respect to the plan view longitudinal configuration of said primary leaf spring, the first primary pivot coupling and the secondary pivot coupling being arranged to be substantially coplanar.

12. The vehicle suspension arrangement of claim 11, wherein there is further provided a height adjustment arrangement for varying a distance between the first end of said secondary leaf spring and the chassis rail of the vehicle.

13. The vehicle suspension arrangement of claim 11, wherein there is further provided a fulcrum for changing a spring rate characteristic of said secondary leaf spring.

* * * * *